(12) United States Patent
Dasgupta

(10) Patent No.: US 8,688,584 B2
(45) Date of Patent: Apr. 1, 2014

(54) ELECTRONIC GAMING MACHINE SECURITY FOR SOFTWARE STORED IN NONVOLATILE MEDIA

(75) Inventor: Ranjan Dasgupta, Naperville, IL (US)

(73) Assignee: WMS Gaming Inc., Waukegan, IL (US)

( * ) Notice: Subject to any disclaimer, the term of this patent is extended or adjusted under 35 U.S.C. 154(b) by 779 days.

(21) Appl. No.: 12/528,658

(22) PCT Filed: Feb. 12, 2008

(86) PCT No.: PCT/US2008/001835
§ 371 (c)(1),
(2), (4) Date: Aug. 26, 2009

(87) PCT Pub. No.: WO2008/108916
PCT Pub. Date: Sep. 12, 2008

(65) Prior Publication Data
US 2010/0048297 A1 Feb. 25, 2010

Related U.S. Application Data

(60) Provisional application No. 60/904,260, filed on Mar. 1, 2007.

(51) Int. Cl.
*G06F 21/00* (2013.01)
*G06F 9/00* (2006.01)
*H04L 29/06* (2006.01)
(52) U.S. Cl.
USPC .................................. 705/51; 713/2; 713/156
(58) Field of Classification Search
None
See application file for complete search history.

(56) References Cited

U.S. PATENT DOCUMENTS

| | | | | |
|---|---|---|---|---|
| 7,155,710 B2* | 12/2006 | Breckner et al. | | 717/168 |
| 7,398,524 B2* | 7/2008 | Shapiro | | 717/175 |
| 7,886,288 B2* | 2/2011 | Breckner et al. | | 717/168 |
| 8,051,377 B1* | 11/2011 | Gourdol | | 715/730 |
| 2003/0028779 A1 | 2/2003 | Rowe | | |
| 2003/0195033 A1* | 10/2003 | Gazdic et al. | | 463/20 |
| 2004/0002381 A1* | 1/2004 | Alcorn et al. | | 463/37 |
| 2004/0248646 A1* | 12/2004 | Canterbury | | 463/29 |
| 2004/0259643 A1* | 12/2004 | Gentles | | 463/43 |
| 2005/0009599 A1* | 1/2005 | Ryan | | 463/29 |

(Continued)

FOREIGN PATENT DOCUMENTS

EP 1489567 A1 12/2004
WO WO 01/24012 A1 4/2001

OTHER PUBLICATIONS

Written Opinion corresponding to co-pending International Patent Application Serial No. PCT/US2008/001835, European Patent Office; dated Jul. 8, 2008; 5 pages.

(Continued)

*Primary Examiner* — Alexander Kalinowski
*Assistant Examiner* — Murali Dega
(74) *Attorney, Agent, or Firm* — Nixon Peabody LLP

(57) ABSTRACT

An illustrative method provides security of software resident on electronic gaming machines (EGMs) that permit wagering on games. A determination is made if all software files stored on a partition of a nonvolatile storage device resident in an EGM are authenticated image type files prior to any attempt to execute any of the software files. Further processing by the EGM of all of the software files is terminated upon the determination that one of the software files is not an authenticated image type file.

19 Claims, 4 Drawing Sheets

(56) References Cited

U.S. PATENT DOCUMENTS

| | | | |
|---|---|---|---|
| 2005/0143171 A1* | 6/2005 | Loose | 463/29 |
| 2005/0173518 A1* | 8/2005 | Takayama | 235/380 |
| 2005/0228809 A1* | 10/2005 | Asano et al. | 707/100 |
| 2006/0100010 A1* | 5/2006 | Gatto et al. | 463/29 |
| 2006/0196686 A1* | 9/2006 | Gatto et al. | 173/191 |
| 2006/0253702 A1* | 11/2006 | Lowell et al. | 713/156 |
| 2007/0054734 A1* | 3/2007 | Morrow et al. | 463/29 |
| 2007/0155487 A1* | 7/2007 | Nakano et al. | 463/29 |
| 2007/0156900 A1* | 7/2007 | Chien | 709/225 |
| 2008/0189539 A1* | 8/2008 | Hsu | 713/2 |
| 2008/0300038 A1* | 12/2008 | Sylla | 463/16 |
| 2009/0282397 A1* | 11/2009 | Leporini et al. | 717/174 |

OTHER PUBLICATIONS

International Search Report corresponding to co-pending International Patent Application Serial No. PCT/US2008/001835, European Patent Office; dated Jul. 8, 2008; 3 pages.

* cited by examiner

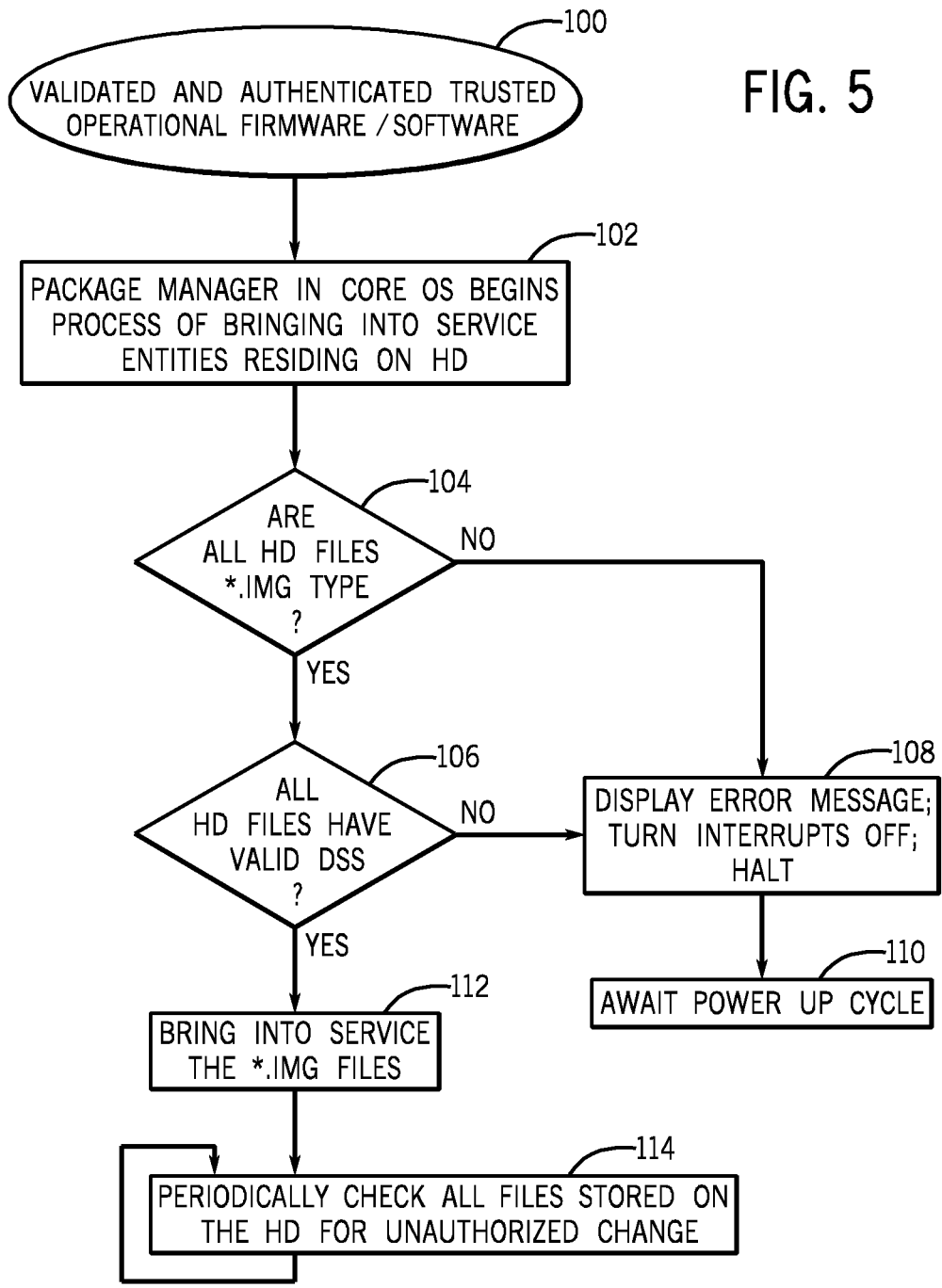

ELECTRONIC GAMING MACHINE SECURITY FOR SOFTWARE STORED IN NONVOLATILE MEDIA

CROSS-REFERENCE TO RELATED APPLICATIONS

This application is a U.S. National Stage of International Application No. PCT/US2008/001835, filed Feb. 12, 2008, which claims the benefit of U.S. Provisional Application No. 60/904,260, filed on Mar. 1, 2007, both of which are incorporated herein by reference in their entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to electronic gaming machines (EGMs) that support wagering on wagering games, and more particularly to the security of software stored in nonvolatile media in EGMs.

BACKGROUND OF THE INVENTION

Gaming machines, such as slot machines and video poker machines, have been a cornerstone of the gaming industry for several years. EGMs, especially microprocessor-based gaming machines that store gaming programs in nonvolatile media in the EGM, advantageously provide flexibility in updating and modifying games playable on the EGM through the control of the software residing on the EGM. EGMs can be configured as clients of a server that manage the software resident on the EGM. Alternatively, the software resident on an EGM may also be updated locally such as by software and/or data stored on nonvolatile removable media, e.g. compact flash memory card, which is directly inserted into the EGM.

The ability to update the software on an EGM also gives rise to security concerns. Unauthorized changes or control of the resident software on an EGM could compromise the integrity of the wagering system. However, the convenience, reduced costs and flexibility of storing and updating gaming software resident on non-removable media, e.g. a hard drive, in an EGM makes such usage desirable. Thus, there is a need to substantially minimize, if not totally eliminate, the possibility of unauthorized control or modification of software resident on an EGM.

SUMMARY OF THE INVENTION

According to one aspect of the present invention, an embodiment includes an illustrative method that provides security of software resident on EGMs that permit wagering on games. A determination is made if all software files stored on a partition of a nonvolatile storage device resident in an EGM are authenticated image type files prior to any attempt to execute any of the software files. Further processing by the EGM of all of the software files is terminated upon a determination that one of the software files is not an authenticated image type file.

According to another aspect of the invention, an embodiment includes an EGM adapted to implement this method.

According to yet another aspect of the invention, a computer readable tangible storage medium is encoded with instructions for enabling an EGM to perform the above method.

Additional aspects of the invention will be apparent to those of ordinary skill in the art in view of the detailed description of various embodiments, which is made with reference to the drawings, a brief description of which is provided below. The use of the same reference numeral in the drawings is utilized to denote identical or similar elements.

BRIEF DESCRIPTION OF THE DRAWINGS

FIG. 5 is a flow chart of an illustrative method for maintaining the security of software stored at the EGM in accordance with an embodiment of the present invention.

DETAILED DESCRIPTION

Various embodiments of this invention can be utilized. The drawings and descriptions of embodiments of the invention exemplify its principles and are not intended to limit the broad aspect of the invention to only the illustrated embodiments.

Figure 1:
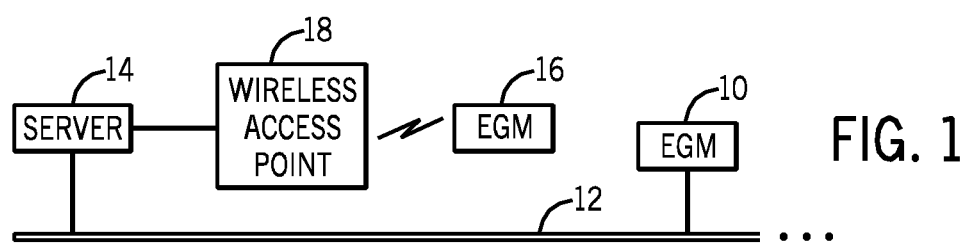
FIG. 1 is a block diagram of a gaming system suited for incorporation of an embodiment of the present invention.

FIG. 1 shows an illustrative gaming system in which an exemplary EGM 10 is coupled by bidirectional communication bus 12 to a server 14. In this illustrative embodiment the EGM 10 functions as a client of server 14. The server 14 stores software programs representing a plurality of different games that can be downloaded to and executed by the EGMs. The server can also update gaming software stored at the EGMs. Another EGM 16 is coupled to server 14 through a wireless communication channel supported by wireless access point 18. As used herein an electronic gaming machine includes all types of electronic apparatus capable of operating gaming software such as, but not limited to, special and general purpose computers, laptop computers, personal digital assistants, hand-held devices with screens that are capable of telephone communications, etc.

Figure 2:
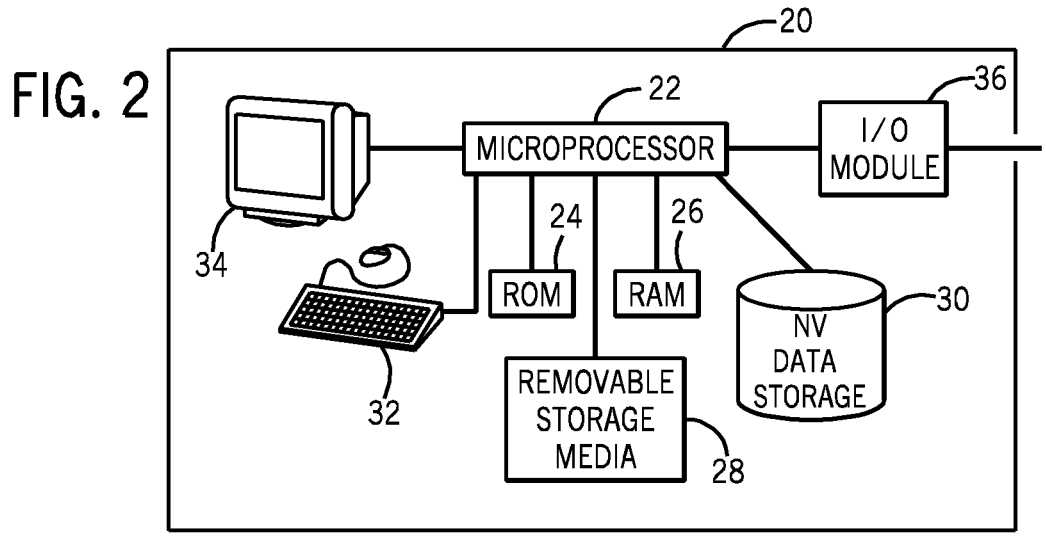
FIG. 2 is a block diagram of a representative EGM.

FIG. 2 shows an illustrative EGM 20 in which gaming software programs are stored wherein at least one of the gaming programs is executed to provide a game upon which a user (player) can place wagers. A microprocessor 22 is supported by read-only memory (ROM) 24, random access memory (RAM) 26, a removable storage media 28, and a nonvolatile data storage device 30. The removable storage media 28 may comprise any form of input/output device capable of reading from and/or writing to removable media such as a floppy disk, USB flash module, compact flash card, etc. In the illustrative embodiment, a removable compact flash device holds the kernel/operating system (OS) of the EGM and is not writable, e.g. the write-lines are disabled in hardware of the compact flash drive. This enhances security built around the core OS which can be stored on compact flash. The nonvolatile data storage device 30 may comprise any form of nonvolatile storage devices such as a hard drive that is not considered to be removable storage media. The non-volatile storage devices as applicable to this EGM context are writable. Input devices 32 such as a keyboard, mouse, etc. can be utilized by an administrator to input information and control instructions. Output devices 34 such as a visual display can be utilized to provide text, characters and graphical information to the administrator of the EGM. Additional types of known input devices 32 and output devices 34 can be utilized provide interactive communications with the user/player during the play of a game by the EGM. These devices (not shown) may include a payoff mechanism, a secondary display, a money/credit detector, a player input device, a player identification reader, etc. An input/output module 36 is coupled to microprocessor 22 and provides an interface supporting communications between the microprocessor and external devices.

As will be understood by those skilled in the art, data and stored program instructions in ROM 24 are typically utilized by microprocessor 22 to initialize and boot the computing apparatus. One or more application programs, e.g. gaming programs that controls the implementation of corresponding games, are stored in storage element 30. At least portions of the active application program will be typically stored in RAM 26 for ready access and processing by microprocessor 22.

Figure 3:
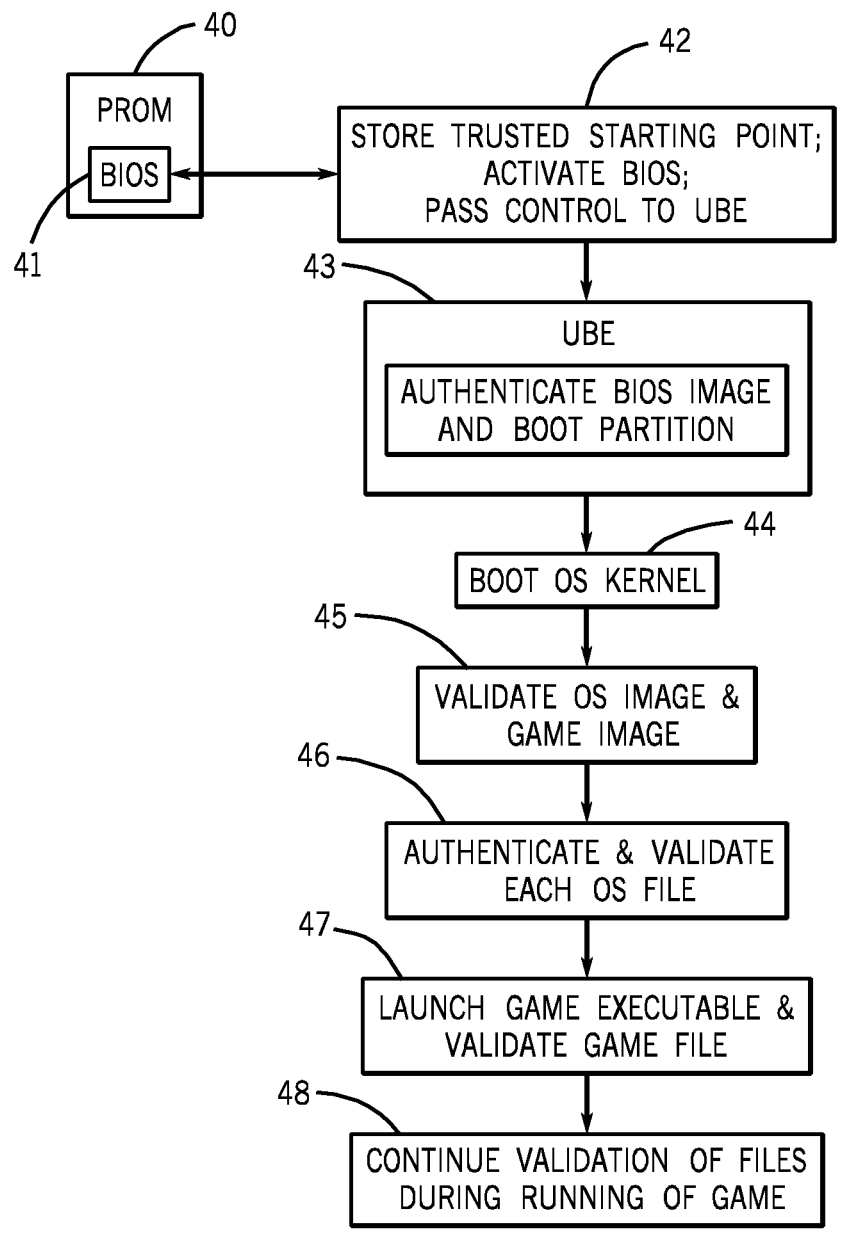
FIG. 3 is a representation of an illustrative process used to boot up and control an EGM.

FIG. 3 shows an exemplary process for the boot, initialization and execution of software stored on an EGM. In the example hereinafter, this storage device is a hard drive contained in the subject EGM. Although other operating systems can be utilized, the exemplary embodiment is described as operating in a Linux operating system. A basic input/output system (BIOS) 41 is disposed in a programmable read only memory (PROM) chip 40. In step 42 a trusted starting point is stored and the BIOS activated. The BIOS performs typical checks and upon the checks being confirmed, control is passed to the user BIOS extension (UBE). In step 43 the UBE authenticates the BIOS image and the boot partition. In step 44 the operating system kernel is booted. The operating system image and game image are validated in step 45. Each operating system file is authenticated and validated in step 46. In step 47 the executable of the game to be run on the subject EGM is launched and the game files validated. This brings the EGM to a secure operational mode in which the game being run is available for play by a user. In step 48 continuous validation of the files is performed in the background during the running of the game in order to continuously monitor security of the EGM.

Figure 4:
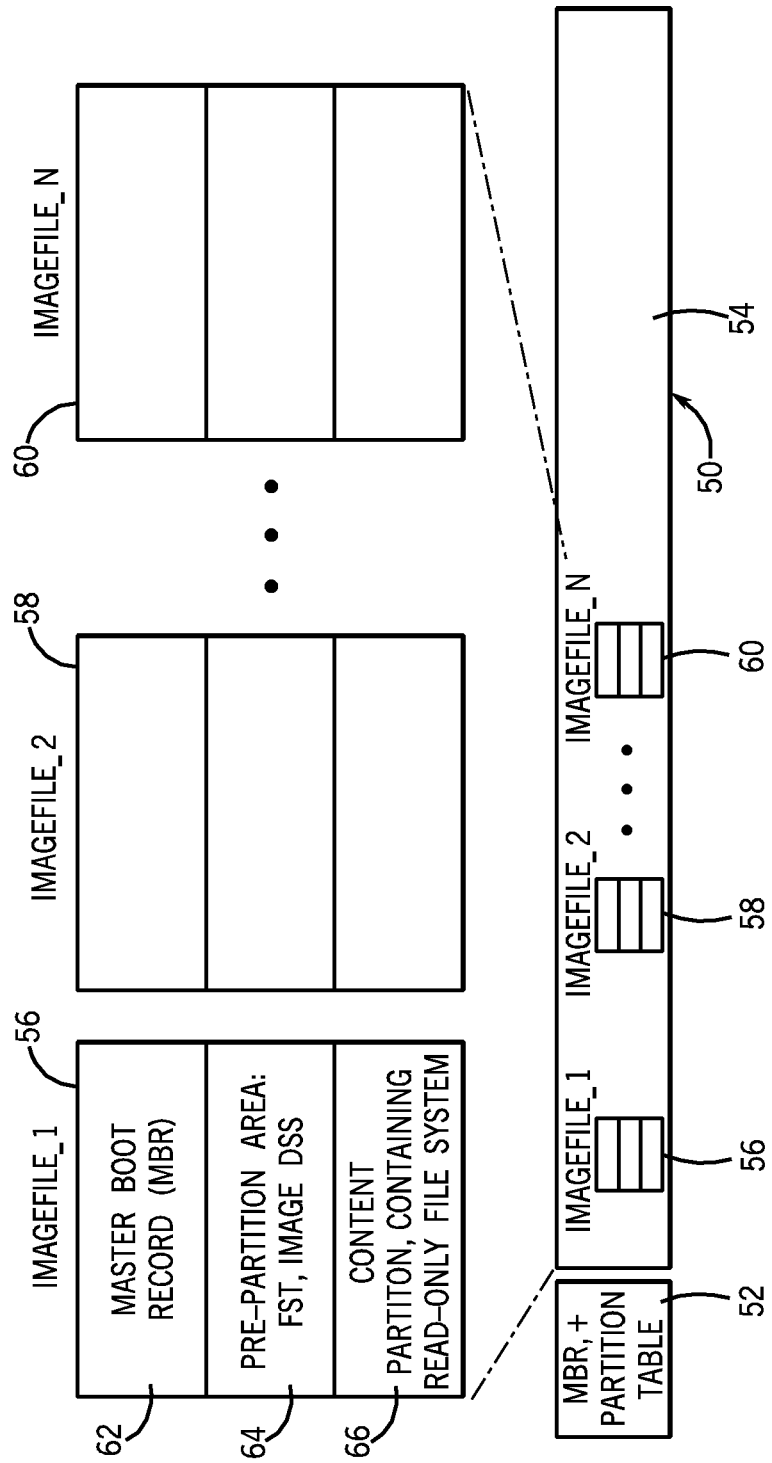
FIG. 4 is a representation of an illustrative non-removable storage media that stores software resident on an EGM.

FIG. 4 shows an illustrative embodiment of a hard drive 50 in accordance with the present invention for use in an EGM. The hard drive includes a section 52 containing a master boot record (MBR) and partition table. The remaining portion 54 of the hard drive preferably contains a single read/write partition that is treated as a quarantine area for all content contained in it. That is, contents contained in this area cannot be executed directly and must be authenticated prior to being brought into service via the mount command. The partition 54 can be formatted as a read/write file system such as utilizing a Linux ext3 file system with a "-noexec" option preventing the system from directly executing any content in section 54 of the hard drive.

Exemplary image files 56, 58 and 60 reside within partition 54 of the hard drive 50. Each image file may be on the form "*.img" where * denotes the title of a specific file and "img" defines the format category of the file. In this example each image file represents a different game application stored as an image file type. Each image file may have a similar internal structure as represented by the blow up of image file 56. Each may include a master boot record 62, pre-partition area 64 and a partition area 66. The pre-partition area 64 may include a file signature table (FST) used to store digital signatures for files and/or the entire image in a standard format, such as the digital signature standard (DSS). Partition portion 66 includes the content portion containing a read-only file system of the subject files, e.g. a particular game application.

FIG. 5 is a flow diagram of an illustrative method in accordance with the present invention. One objective of the illustrative method is to safeguard the integrity, validity, authentication and trustworthiness of the contents of a hard drive of an EGM. In step 100 operational firmware/software outside of the hard drive has been previously validated and authenticated for trustworthiness. For example the EGM may contain a compact flash card installed prior to the initial boot up process. In accordance with directions from the BIOS, the Linux boot process may initially proceed from information and a partition stored on the compact flash card resulting in validation and authentication of the BIOS itself as well as the contents of the compact flash card.

In step 102 control is passed to the package manager (pkgmgr) of the core operating system which begins the process of bringing into service entities, e.g. files, residing in partition 54 of the hard drive 50. The core OS resides on a read-only compact flash card and has already been validated to be an authentic copy. In step 104 a determination is made if all of the files in partition 54 of hard drive 50 are image ("*.img") type files. This may be accomplished by reading the table of files to determine if any files are not of the image file type. Files need not be opened or attempted to be opened to determine the type of file. This prevents an unauthorized executable file from being run. The YES determination by step 104 leads to the further determination in step 106 in which a determination is made if all of the image files have a valid digital signature standard. This may be accomplished by authenticating the digital signature standard information for each file using a trusted public key in a predetermined location to determine validity. A NO determination by step 106 or by step 104 results in step 108 causing an error message to be displayed, and an interruption of the microprocessor, e.g. a halt command being issued causing an immediate termination of processing by the microprocessor. Following step 108 and the resulting termination of processing, the process is started from the beginning upon a new power up cycle as indicated instep 110.

A YES determination by step 106 results in the core operating system bringing into service the image files as indicated in step 112. Assume that image file 56 is to be brought into service and is to be executed on the EGM thereby providing an electronic game on which a player can place wagers. An image descriptor file located in the content partition in the image file is read to obtain information describing how this image file is to be installed. The content of the image file can be mounted on a temporary mount point in order to read the image descriptor file such as with a Loop[x] Linux function. If the content partition of the image file contains one or more executable modules, a Linux file-integrity kernel module is instructed to load the file signature table associated with the executable modules and to perform an open ( ) time file validation for the executable modules. If the image file does not contain an executable module, e.g. it may contain only resource files and/or data, the content of the image file can be mounted at the point specified in the image descriptor file without the Linux file-integrity kernel module checking described above.

Although this completes the initial check of trustworthiness of all the image files contained in partition 54 of the hard drive, all files stored in the hard drive are periodically checked for any unauthorized changes as indicated in step 114 thereby continually verifying the trustworthiness of all files stored in partition 54 of the hard drive. Upon finding an unauthorized change of a file, the process will proceed to steps 108 and 110 as explained above.

In addition to the trustworthiness of each file being checked, system security is enhanced by maintaining only a single partition on the nonvolatile storage media, e.g. hard drive, restricted to prevent direct execution of files residing thereon and by permitting only image type files to validly reside thereon. This security measure may also be applied to removable media. However, more than one partition on the hard drive could be utilized.

The EGM in one example employs one or more computer readable signal bearing tangible media that stores software, firmware and/or assembly language for performing one or more portions of one or more embodiments of the invention. The computer-readable signal-bearing tangible media in one example comprises one or more of a magnetic, electrical, optical, biological, and atomic data storage medium. For example, the computer-readable signal-bearing media may comprise floppy disks, magnetic tapes, CD-ROMs, DVD-ROMs, hard disk drives, USB flash memory and electronic memory modules.

The steps or operations described herein are only examples. There may be many variations to these steps or operations without departing from the spirit of the invention. For instance, the steps may be performed in a differing order, or steps may be added, deleted, or modified. Although "*.img" files are described in the above example, any type of "image" file could be used, where an image file means a file that is not able to be executed without further processing. In addition to the security process being implemented by an EGM, the process can also be implemented by a server coupled to the EGMs.

The embodiment and obvious variations thereof are contemplated as falling within the spirit and scope of the claimed invention, which is set forth in the following claims.

What is claimed is:

1. A method for providing security of software resident on electronic gaming machines (EGMs) that permit wagering on games comprising the steps of:
    determining if all software files stored on a partition of a nonvolatile storage device resident in an EGM are authenticated image type files prior to any attempt to execute any of the software files, where the nonvolatile storage device is a hard drive formatted to have only one partition in which all files stored in the one partition are quarantined such that the files cannot be directly executed, the determining step further determining if all files stored in the one partition are of the image type, wherein the storage device includes a primary master boot record;
    terminating further processing by the EGM of all of the software files upon the determination that at least one of the software files stored in the one partition is not an authenticated image type file, wherein each of the authenticated image type files includes (a) a master boot record for the image type file, (b) a valid digital signature associated with the image type file and (c) a plurality of digital signatures each associated with corresponding ones of at least some read-only files contained in the image type file, (d) a read-only file system of the read-only files, and (e) a descriptor file describing how the read-only files are to be installed, the method further comprising the steps of:
    responsive to determining that at least one of the files stored in the one partition is an authenticated image type file, an operating system mounting the read-only files in accordance with the descriptor file; and
    prior to executing an executable file of the read-only files stored in the image type file, the executable file having an associated first digital signature of the plurality of digital signatures stored in the at least one authenticated image type file, validating the executable file using the first digital signature.

2. The method of claim 1 wherein the determining step further comprises determining the authentication of each of said files by authenticating a digital signature associated with each file using a public key stored at a predetermined location.

3. The method of claim 1 wherein the determining step further comprises determining whether each of said software files has a file format such that an install procedure needs to be executed before the software files can be brought into service.

4. The method of claim 1 further comprising the step of determining if each file stored on the one partition is an image type software file without opening or attempting to open any file stored in the one partition.

5. The method claim 4 wherein the determination of whether each file stored on the one partition is an image type software file comprises reading a file type characteristic for each stored file from a table of files stored on the hard drive outside of the one partition.

6. An electronic gaming machine that permits wagering on games comprising:
    a nonvolatile storage device comprising a hard drive being formatted to have only one partition that contains all software files stored on the hard drive, all files stored in the one partition being quarantined such that the files cannot be directly executed, the nonvolatile storage device including a primary master boot record;
    a microprocessor apparatus, coupled to the nonvolatile storage device, configured to determine if all of the software files stored on the one partition of the nonvolatile storage device are authenticated image type files prior to any attempt by the microprocessor apparatus to execute any of the software files;
    the microprocessor apparatus further configured to terminate further processing of all of the software files upon determining that at least one of the software files stored in the one partition is not an authenticated image type file,
    wherein at least one of the software files includes (a) a master boot record, (b) a digital signature associated with the at least one of the software files and (c) a plurality of digital signatures each associated with corresponding ones of at least some read-only files in the image type file corresponding to the at least one software file, and (d) a file system of the read-only files, the microprocessor apparatus being configured to:
    responsive to the microprocessor apparatus determining that the at least one software file is an authenticated image type file, cause an operating system to mount the corresponding read-only files, the read-only files including an executable file having an associated digital signature of the plurality of digital signatures; and
    prior to execution of the executable file, validate the executable file using the associated digital signature.

7. The electronic gaming machine of claim 6 wherein the microprocessor apparatus is configured to determine the authentication of each of said files by authenticating a digital signature stored and associated with each file using a public key stored at a predetermined location.

8. The electronic gaming machine of claim 6 wherein the microprocessor apparatus is configured to determine whether each of said software files has a file format such that an install procedure needs to be executed before the software files can be brought into service.

9. The electronic gaming machine of claim 6 wherein the microprocessor apparatus is configured to determine if each file stored on the one partition is an image type software file without opening or attempting to open any file stored in the one partition.

10. The electronic gaming machine of claim 9, wherein the microprocessor apparatus is configured to make the determination of whether each file stored on the one partition is an image type software file by reading a file type characteristic for each stored file from a table of files stored on the hard drive outside of the one partition.

11. A non-transitory tangible computer readable storage medium encoded with instructions for controlling an electronic gaming machine (EGM) that permits wagering on games comprising:
    computer readable storage instructions for determining if all software files stored on a partition of a nonvolatile storage device resident in an EGM are authenticated image type files prior to any attempt to execute any of the software files, where the nonvolatile storage device is a hard drive formatted to have only one partition in which all files stored in the one partition are quarantined such that the files cannot be directly executed, the computer readable storage instructions further causing a determination if all files stored in the one partition are of the image type, wherein the hard drive includes a primary master boot record;
    computer readable storage instructions for terminating further processing by the EGM of all of the software files upon the determination that at least one of the software files stored in the one partition is not an authenticated image type file,
    wherein the authenticated image type file includes (a) a master boot record, (b) a valid digital signature associated with the image type file and (c) a plurality of digital signatures each associated with corresponding ones of at least some read-only files contained in the image type file, and (d) a descriptor file describing how the read-only files are to be installed, the computer readable storage medium further comprising:
    computer readable storage instructions for causing an operating system to mount the read-only files in accordance with the descriptor file; and
        computer readable storage instructions for validating an executable file of the read-only files stored in the image type file, using a first digital signature of the plurality of digital signatures associated with the executable file, prior to executing the executable file.

12. The computer readable storage medium of claim 11 further comprising:
    computer readable storage instructions for determining whether each of said software files has file format such that an install procedure needs to be executed before the software files can be brought into service.

13. The computer readable storage medium of claim 11 further comprising:
    computer readable storage instructions for determining if each file stored on the one partition is an image type software file without opening or attempting to open any file stored in the one partition.

14. The computer readable storage medium of claim 13 wherein the determination of whether each file stored on the one partition is an image type software file comprises reading a file type characteristic for each stored file from a table of files stored on the hard drive outside of the one partition.

15. A server that supports electronic gaming machines that permits wagering on games, the server comprising:
    a nonvolatile storage device comprising a hard drive being formatted to have only one partition that contains all software files stored on the hard drive, all files stored in the one partition being quarantined such that the files cannot be directly executed, the nonvolatile storage device having a primary master boot record;
    microprocessor apparatus, coupled to the nonvolatile storage device, that is configured to determine if all of said software files stored on the one partition of the nonvolatile storage device are authenticated image type files prior to any attempt by the microprocessor apparatus to execute any of the software files;
    the microprocessor apparatus being further configured to terminate further processing of all of the software files upon determining that at least one of the software files stored in the one partition is not an authenticated image type file,
    wherein the authenticated image type file includes (a) a master boot record, (b) a valid digital signature associated with the image type file and (c) a plurality of digital signatures each associated with corresponding ones of at least some read-only files contained in the image type file, (d) a read-only file system of the read-only files, the microprocessor apparatus being configured to:
    cause an operating system to mount the read-only files, the read-only files including an executable file having a corresponding digital signature of the plurality of digital signatures; and
    prior to execution of the executable file, validate the executable file using the corresponding digital signature associated with the executable file.

16. The server of claim 15 wherein the microprocessor apparatus is configured to determine the authentication of each of said files by authenticating a digital signature stored and associated with each file using a public key stored at a predetermined location.

17. The server of claim 15 wherein the microprocessor apparatus is configured to determine whether each of said software files has a file format such that an install procedure needs to be executed before the software files can be brought into service.

18. The server of claim 15 wherein the microprocessor apparatus is configured to determine if each file stored on the one partition is an image type software file without opening or attempting to open any file stored in the one partition.

19. The server of claim 18, wherein the microprocessor apparatus is configured to make the determination of whether each file stored on the one partition is an image type software file by reading a file type characteristic for each stored file from a table of files stored on the hard drive outside of the one partition.

* * * * *

UNITED STATES PATENT AND TRADEMARK OFFICE
CERTIFICATE OF CORRECTION

PATENT NO. : 8,688,584 B2 Page 1 of 1
APPLICATION NO. : 12/528658
DATED : April 1, 2014
INVENTOR(S) : Ranjan Dasgupta It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 960 days.

Signed and Sealed this

Twenty-ninth Day of September, 2015

Michelle K. Lee
*Director of the United States Patent and Trademark Office*